US007843385B2

(12) United States Patent
Sohfuku et al.

(10) Patent No.: US 7,843,385 B2

(45) Date of Patent: Nov. 30, 2010

(54) ANTENNA DEVICE

(75) Inventors: Satoru Sohfuku, Tokyo (JP); Junji Takaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 193 days.

(21) Appl. No.: 12/272,154

(22) Filed: Nov. 17, 2008

(65) Prior Publication Data

US 2009/0237303 A1 Sep. 24, 2009

(30) Foreign Application Priority Data

Mar. 18, 2008 (JP) .......................... P2008-069472

(51) Int. Cl.
*H01Q 3/00* (2006.01)
*G01S 5/02* (2010.01)

(52) U.S. Cl. ...................................... 342/359; 342/430

(58) Field of Classification Search ................. 342/359, 342/430

See application file for complete search history.

(56) References Cited

U.S. PATENT DOCUMENTS

| | | | | |
|---|---|---|---|---|
| 6,538,602 B2 * | 3/2003 | Natsume et al. | 342/359 |
| 2003/0016172 A1 | 1/2003 | Natsume et al. | |
| 2003/0034928 A1 | 2/2003 | Murakado | |
| 2004/0212794 A1 | 10/2004 | Mizuno | |
| 2007/0032950 A1 * | 2/2007 | O'Flanagan et al. | 701/214 |

FOREIGN PATENT DOCUMENTS

| | | |
|---|---|---|
| EP | 1 511 118 A1 | 3/2005 |
| GB | 2 432 459 A | 5/2007 |
| JP | 2002-333011 | 11/2002 |
| JP | 2004-340372 | 12/2004 |
| JP | 2005-140185 | 6/2005 |
| JP | 2007-129454 | 5/2007 |

OTHER PUBLICATIONS

Wodek Gawronski, et al., "Azimuth-Track Level Compensation to Reduce Blind-Pointing Errors of the Deep Space Network Antennas", IEEE Antennas and Propagation Magazine, vol. 42, No. 2, XP011081242, Apr. 2000, pp. 28-38.

* cited by examiner

*Primary Examiner*—Thomas H Tarcza
*Assistant Examiner*—Harry Liu
(74) *Attorney, Agent, or Firm*—Oblon, Spivak, McClelland, Maier & Neustadt, L.L.P.

(57) ABSTRACT

An antenna device includes: an antenna base portion; an antenna mount portion which is supported by the antenna base portion and rotated around an azimuth axis and which supports a main reflector with two struts; a frame structure group including a plurality of frame structures which are provided in the antenna base portion and the antenna mount portion, with six degrees of freedom restrained, respectively; a displacement gauge group which measures a displacement of the frame structure group; a metrology correction portion which calculates a pointing error of an antenna based on measured data of the displacement gauge group and calculates a metrology correction amount by removing an error amount arising depending on an azimuth angle from the calculated pointing error; and a control circuit which controls a driving of the antenna by correcting a drive command value of the antenna with the metrology correction amount.

14 Claims, 12 Drawing Sheets

DEFINITION OF θAZ

ANTENNA DEVICE

CROSS-REFERENCE TO RELATED APPLICATIONS

This application is based upon and claims the benefit of priority from Japanese Patent Application No. 2008-069472, filed Mar. 18, 2008, the entire contents of which are incorporated herein by reference.

BACKGROUND OF THE INVENTION

1. Field of the Invention

This present invention relates to an antenna device capable of measuring a displacement or inclination of a support structure having influence on the pointing direction to correct the pointing direction.

2. Description of the Related Art

In the field of a radio astronomy, there is a growing demand for observing electric wave of higher frequency from millimeter wave to sub-millimeter wave in recent years. In observing the radio celestial body of higher frequency, it is required that a reflector surface of antenna and a directional tracking of beam have higher precision. On the other hand, to increase the observation efficiency, the antenna having a larger aperture has progressed and it is desired to allow the observations in all kinds of weather at day and night. If the aperture is larger, an own weight deformation of antenna is increased, and a thermal deformation or deformation due to wind pressure is increased, whereby it is difficult to attain a high directional tracking precision. To satisfy a demand for high directional tracking precision, it is required a technique for measuring and correcting the pointing error of a reflector for the antenna in real time. One of the factors of having influence on the pointing error of antenna is a deformation of a structural portion supporting the main reflector, and as means for measuring this deformation, optical instrumentation means using a laser and an optical detector and instrumentation means with a mechanical method may be considered. However, for the former, it is difficult to make the fast measurements because there is a large measurement error due to atmospheric fluctuations within the optical system, and due to a processing delay of optically detected image. On the other hand, the instrumentation means with the mechanical method which obtains a pointing error of an antenna structure by installing a frame structure unsusceptible to thermal deformation or wind deformation in an antenna supporting structure was disclosed in JP-A-2007-129454.

SUMMARY OF THE INVENTION

The related-art device as disclosed in JP-A-2007-129454 measures the pointing error by installing the frame structure unsusceptible to thermal deformation or wind deformation in the antenna support structure, correcting the pointing direction of antenna for a measured pointing error. However, in practice, there are some factors such as a pointing error measured by the frame structure and an instrumental error of the antenna itself, whereby there is a need for establishing a tracking control system for picking up the factors contributing to the pointing error and correcting the pointing error at higher precision. Especially in the high precision antenna device for measuring the celestial body with sub-millimeter wave, the construction of such tracking control system has been urgent need.

The present invention has been achieved to solve the above-mentioned problems, and it is an aspect of the present invention to provide an antenna device that can correct a pointing error occurring structurally and thermally in the pointing direction of antenna at high precision.

According to a first aspect of the present invention, there is provided an antenna device comprising: an antenna base portion; an antenna mount portion which is supported by the antenna base portion and rotated around an azimuth axis and which supports a main reflector with two struts; a frame structure group including a plurality of frame structures which are provided in the antenna base portion and the antenna mount portion, with six degrees of freedom restrained, respectively; a displacement gauge group which measures a displacement of the frame structure group; a metrology correction portion which calculates a pointing error of an antenna based on measured data of the displacement gauge group and calculates a metrology correction amount by removing an error amount arising depending on an azimuth angle from the calculated pointing error; and a control circuit which controls a driving of the antenna by correcting a drive command value of the antenna with the metrology correction amount.

According to a second aspect of the present invention, there is provided an antenna device comprising: an antenna base portion; an antenna mount portion which is supported by the antenna base portion and rotated around an azimuth axis and which supports a main reflector with two struts; a frame structure group including a plurality of frame structures which are provided in the antenna base portion and the antenna mount portion, with six degrees of freedom restrained, respectively; a displacement gauge group which measures the displacement of the frame structure group; a metrology correction portion which calculates a pointing error of an antenna based on measured data of the displacement gauge group and calculates a metrology correction amount by removing an error amount arising depending on an azimuth angle from the calculated pointing error; an instrumental error correction portion which outputs an instrumental error that is a pointing error of the antenna arising depending on the azimuth angle; and a control circuit which controls a driving of the antenna by correcting a drive command value of the antenna with the metrology correction amount and the instrumental error.

According to a third aspect of the present invention, in the antenna device according to the first aspect, the frame structure group may comprise: a first frame structure provided in the antenna base portion and supported by an elastic member; a second frame structure provided at three points on a reference member of the antenna mount portion with a Z-axis displacement restrained and with six degrees of freedom restrained; and a third frame structure provided on the strut of the antenna mount portion with six degrees of freedom restrained. And, the displacement gauge group may comprise: a first measuring instrument which measures an attitude of the reference member of the antenna mount portion with respect to the first frame structure; a second measuring instrument which measures an attitude of the third frame structure with respect to the second frame structure; and a third measuring instrument which measures the displacement of a support reference member of the main reflector with respect to the third frame structure.

According to a forth aspect of the present invention, in the antenna device according to the second aspect, the frame structure group may comprise: a first frame structure provided in the antenna base portion and supported by an elastic member; a second frame structure provided at three points on a reference member of the antenna mount portion with a Z-axis displacement restrained and with six degrees of freedom restrained; and a third frame structure provided on the strut of the antenna mount portion with six degrees of freedom restrained. And, the displacement gauge group may comprise: a first measuring instrument which measures an attitude of the reference member of the antenna mount portion with respect to the first frame structure; a second measuring instrument which measures an attitude of the third frame structure with respect to the second frame structure; and a third measuring instrument which measures the displacement of a support reference member of the main reflector with respect to the third frame structure.

According to a fifth aspect of the present invention, in the antenna device according to the third or fourth aspect, the first measuring instrument may include three displacement measuring devices which are provided at three points on the first frame structure and measures the Z-axis direction displacement at three points of the reference member of the antenna mount portion.

According to a sixth aspect of the present invention, in the antenna device according to the third or fourth aspect, the second measuring instrument may include: two displacement measuring devices which are provided at two points on the second frame structure and measures the Z-axis direction displacement at two points of the third frame structure; and one displacement measuring device which is provided at one point on the second frame structure and measures the Y-axis direction displacement at one point of the third frame structure.

According to a seventh aspect of the present invention, in the antenna device according to the third or fourth aspect, the third measuring instrument may include one displacement measuring device which is provided at one point on the third frame structure and which measures the Z-axis direction displacement at one point of the support reference member of the main reflector.

According to an eighth aspect of the present invention, there is provided an antenna device comprising: an antenna base portion; an antenna mount portion which is supported by the antenna base portion and rotated around an azimuth axis and which supports a main reflector with two struts; a first frame structure provided in the antenna base portion and supported by an elastic member; a first measuring instrument which measures an attitude of a reference member of the antenna mount portion with respect to the first frame structure; a second frame structure provided at three points on the reference member of the antenna mount portion and supported by a support member of a bipod structure; a third frame structure provided on the struts of the antenna mount portion with six degrees of freedom restrained; a second measuring instrument which measures an attitude of the third frame structure with respect to the second frame structure; and a third measuring instrument which measures a displacement of a support reference member of the main reflector with respect to the third frame structure.

According to a ninth aspect of the present invention, in the antenna device according to the eighth aspect, the third frame structure may be supported by a parallel link mechanism from the support reference member of the main reflector.

According to a tenth aspect of the present invention, in the antenna device according to the ninth aspect, the third measuring instrument includes one displacement measuring device which is provided at one point on the third frame structure and measures the Y-axis direction displacement at one point of the support reference member of the main reflector.

According to an eleventh aspect of the present invention, in the antenna device according to the first aspect, the frame structure group may comprise: a first frame structure provided in the antenna base portion and supported by an elastic member; a second frame structure provided at three points on a reference member of the antenna mount portion and supported by a support member of a bipod structure; and a third frame structure provided on the struts of the antenna mount portion with six degrees of freedom restrained. And, the displacement gauge group may comprise: a first measuring instrument which measures an attitude of the reference member of the antenna mount portion with respect to the first frame structure; a second measuring instrument which measures an attitude of the third frame structure with respect to the second frame structure; and a third measuring instrument which measures a displacement of a support reference member of the main reflector with respect to the third frame structure.

According to a twelfth aspect of the present invention, in the antenna device according to the second aspect, the frame structure group may comprise: a first frame structure provided in the antenna base portion and supported by an elastic member; a second frame structure provided at three points on a reference member of the antenna mount portion and supported by a support member of a bipod structure; and a third frame structure provided on the struts of the antenna mount portion with six degrees of freedom restrained. And, the displacement gauge group may comprise: a first measuring instrument which measures an attitude of the reference member of the antenna mount portion with respect to the first frame structure; a second measuring instrument which measures an attitude of the third frame structure with respect to the second frame structure; and a third measuring instrument which measures a displacement of a support reference member of the main reflector with respect to the third frame structure.

According to a thirteenth aspect of the present invention, in the antenna device according to eleventh or twelfth aspect, the third frame structure may be supported by a parallel link mechanism from the support reference member of the main reflector.

According to a fourteenth aspect of the present invention, in the antenna device according to eleventh or twelfth aspect, the third measuring instrument may include one displacement measuring instrument which is provided at one point on the third frame structure and measures a Y-axis direction displacement at one point of the support reference member of the main reflector.

According to the configuration of first or second aspect, the metrology correction portion calculates a pointing error of the antenna based on measured data of the displacement gauge group, and calculates a metrology correction amount by removing an error amount arising depending on an azimuth angle from the calculated pointing error, and the control circuit controls the driving of the antenna by correcting a drive command value of the antenna with the metrology correction amount, whereby the antenna driving control can be made at high precision. Also, the antenna drive command value may be corrected by an instrumental error that is a pointing error of the antenna arising depending on the azimuth angle outputted from the instrumental error correction portion, whereby the higher precision can be attained.

According to the configuration of third to seventh aspects, the first frame structure is provided in the antenna base portion, and the second frame structure and third frame structure are provided in the antenna mount portion with six degrees of freedom restrained, and the first measuring instrument measures the attitude of the reference member of the antenna mount portion with respect to the first frame structure, the second measuring instrument measures the attitude of the third frame structure with respect to the second frame structure, and the third measuring instrument measures the displacement of the support reference member of the main reflector with respect to the third frame structure, whereby the measurement of each measuring instrument can be made at high precision by suppressing a load flowing through each frame structure and suppressing an internal deformation of each frame structure.

According to the configuration of eighth aspect, the second frame structure is supported from the reference member of the antenna mount portion by the support member of the bipod structure, whereby the second frame structure is unsusceptible to influence of a deformation of the bottom of the antenna mount portion, and the pointing error of antenna can be measured at high precision.

According to the configuration of ninth or tenth aspect, the third frame structure is supported by the parallel link mechanism from the support reference member of the main reflector, and the displacement measurement of the third measuring instrument is the Y-axis direction, whereby the rotation rigidity around the X axis of the third frame structure can be increased.

According to the configuration of eleventh or twelfth aspect, the metrology correction portion calculates a pointing error of the antenna based on measured data of the displacement gauge group, and calculates a metrology correction amount by removing an error amount arising depending on an azimuth angle from the calculated pointing error, and the control circuit controls the driving of the antenna by correcting a drive command value of the antenna with the metrology correction amount, whereby the antenna driving control can be made at high precision. Also, the antenna drive command value may be corrected by an instrumental error that is a pointing error of the antenna arising depending on the azimuth angle outputted from the instrumental error correction portion, whereby the higher precision can be attained.

According to the configuration of thirteenth or fourteenth aspect, the third frame structure is supported by the parallel link mechanism from the support reference member of the main reflector, and the displacement measurement of the third measuring instrument is the Y-axis direction, whereby the rotation rigidity around the X axis of the third frame structure can be increased.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION OF THE INVENTION

Embodiment 1

Figure 1:
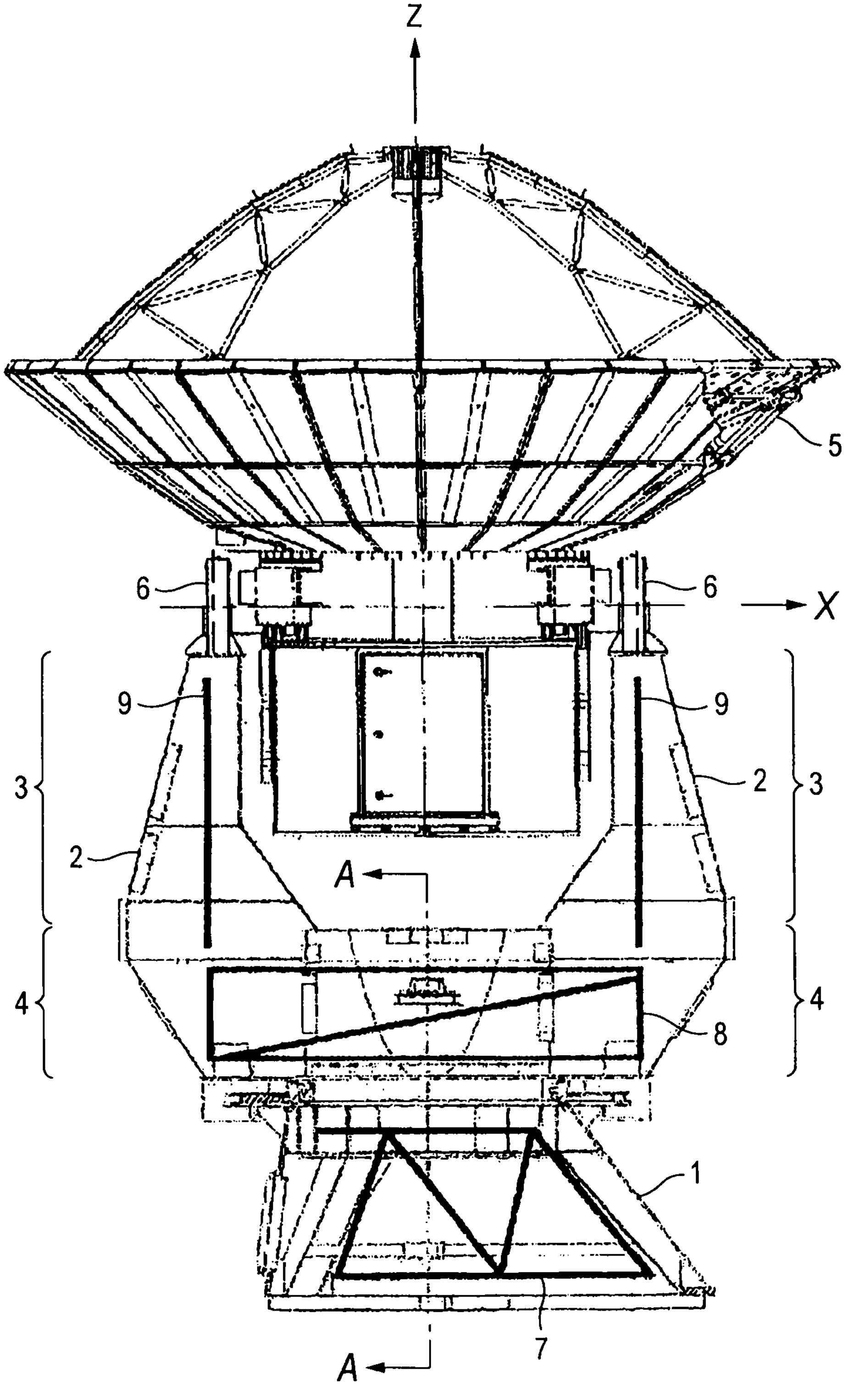
FIG. 1 is a cross-sectional view of an antenna device according to an embodiment 1 of the present invention.
Figure 2:
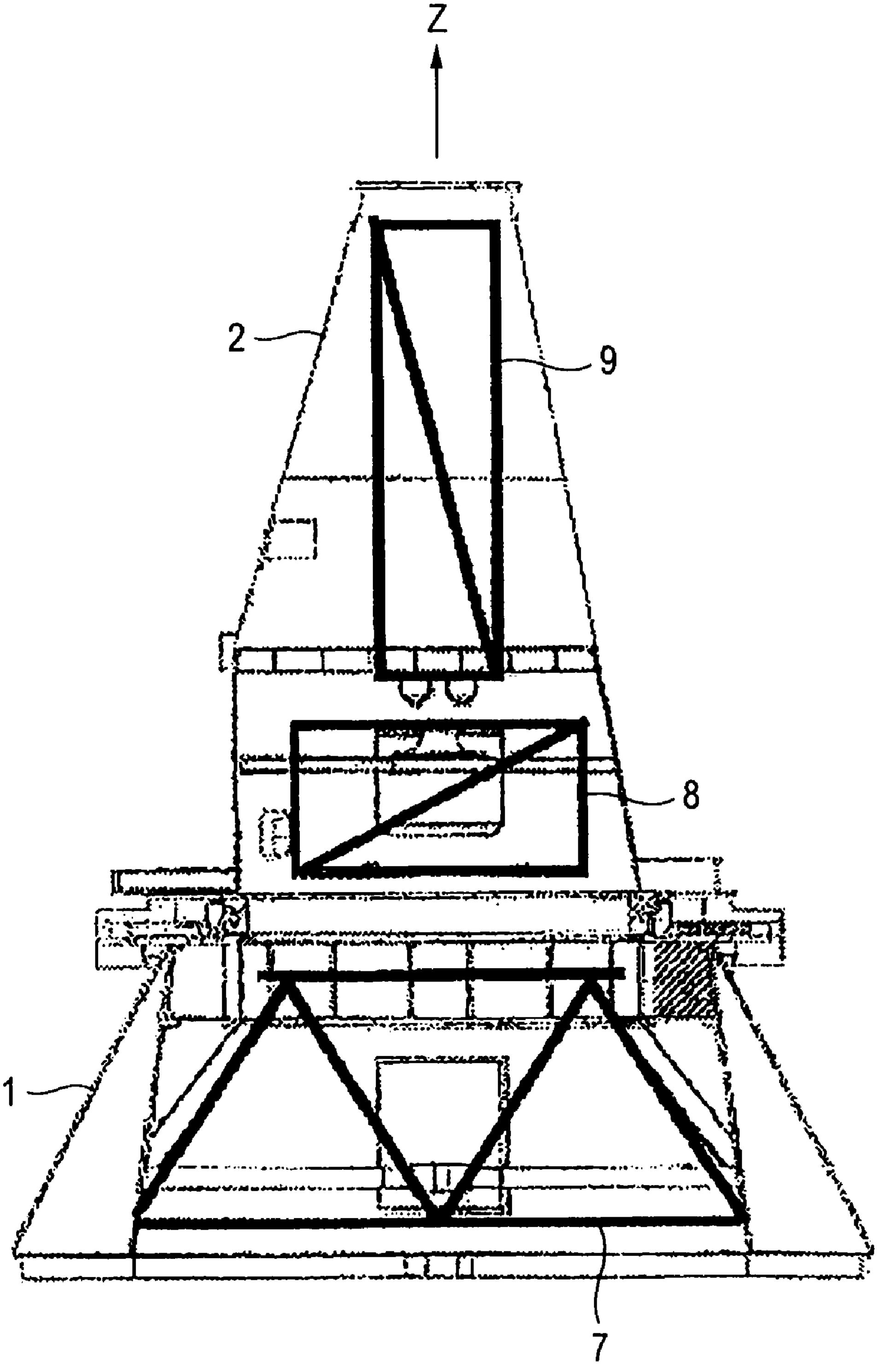
FIG. 2 is a cross-sectional view (excluding a main reflector portion) taken along the line A-A in FIG. 1.

An antenna device according to an embodiment 1 of this invention will be described below with reference to FIGS. 1 to 9. FIG. 1 is a cross-sectional view of the antenna device according to the embodiment 1 of this invention, and FIG. 2 is a cross-sectional view (excluding a main reflector portion) taken along the line A-A in FIG. 1. In FIG. 1, reference numeral 1 denotes an antenna base portion fixed and installed on the ground, and reference numeral 2 denotes an antenna mount portion supported rotatably around an azimuth axis on the antenna base portion 1. In the antenna mount portion 2, reference numeral 3 denotes two strut portions provided on the right and left sides, and reference numeral 4 denotes a bottom portion. Reference numeral 5 denotes a main reflector of the antenna, which is supported rotatably around an elevation axis by the right and left strut portions 3. Reference numeral 6 denotes a housing portion provided on the strut portions 3 and supporting the elevation axis of the main reflector 5.

Reference numeral 7 denotes a first frame structure provided within the antenna base portion 1, reference numeral 8 denotes a second frame structure provided on the bottom portion 4 of the antenna mount portion 2, and reference numeral 9 denotes a third frame structure provided on the strut portions 3 of the antenna mount portion 2. The first frame structure 7, the second frame-structure 8 and the third frame structure 9 have a truss structure, and can be treated as a rigid body by suppressing the flow of a load into them. That is, these frame structures, which are provided and supported on the antenna base portion 1 and the antenna mount portion 2, have a support (kinemateic support) structure without excessive restraint. Also, the internal thermal deformation of each frame structure is suppressed, using a material having low thermal expansion ratio such as Invar or CFRP material.

The operation of the antenna device according to the embodiment 1 will be described below. Since the antenna mount portion 2 is rotated around the azimuth axis, and the main reflector 5 is supported rotatably around the elevation axis by the antenna mount portion 2, whereby the main reflector 5 can be driven within a drive range of the azimuth angle and elevation angle and positioned to set the pointing direction of the antenna. The antenna base portion 1 is provided with an azimuth angle drive mechanism for rotating and positioning the antenna mount portion 2 around the azimuth axis, and the housing portion 6 of the antenna mount portion 2 is provided with an elevation angle drive mechanism for rotating and positioning the main reflector 5 around the elevation axis.

Figure 3:
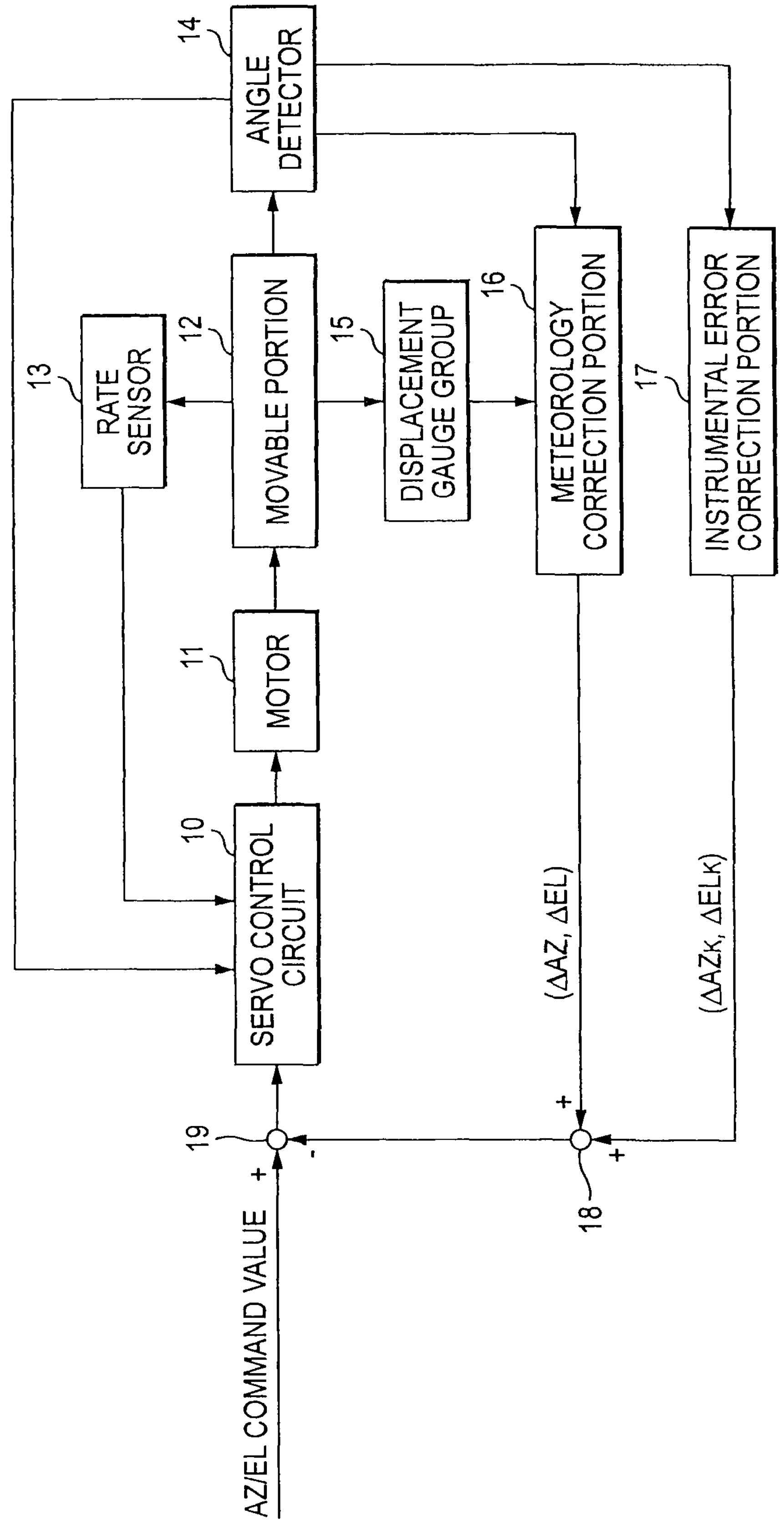
FIG. 3 is a block diagram of a drive control system in the antenna device according to the embodiment 1 of this invention.
Figure 4:
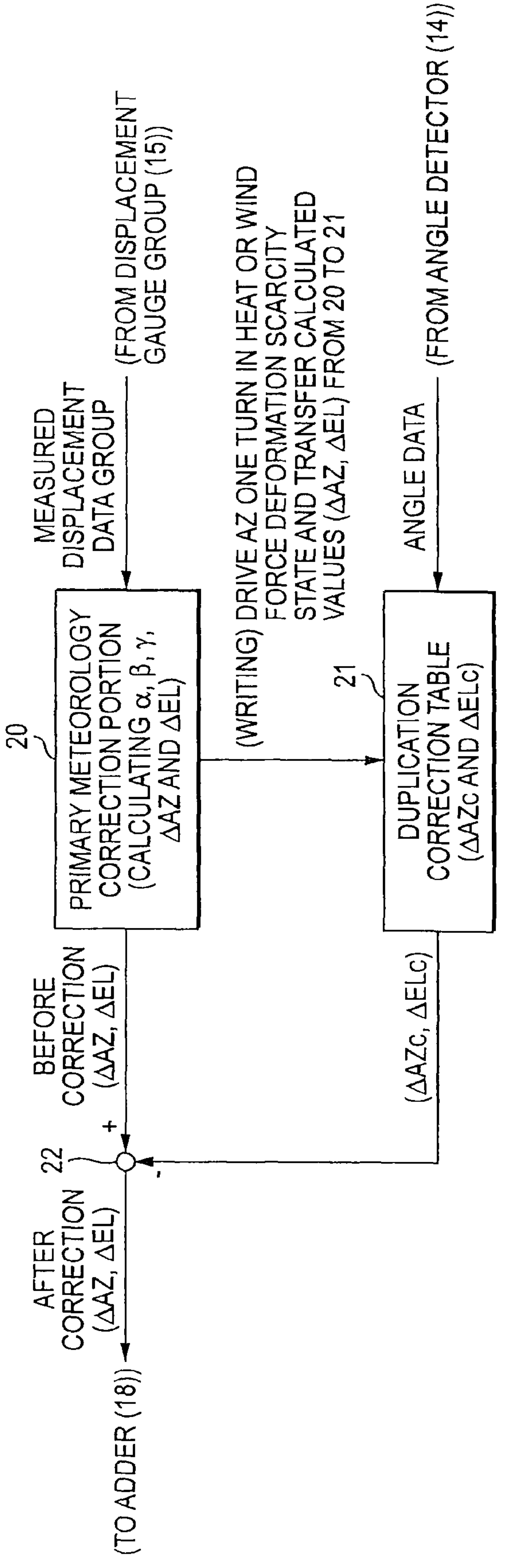
FIG. 4 is a block diagram showing the configuration of a metrology correction portion.

Referring to FIGS. 3 and 4, a driving control for the antenna device according to the embodiment 1 will be described below. FIG. 3 is a block diagram of a drive control system in the antenna device according to the embodiment 1 of this invention, and FIG. 4 is a block diagram showing the configuration of a metrology correction portion. The block diagrams of the drive control system and the metrology correction portion in the antenna device according to an embodiment 2 as will be described later are the same configuration as in FIGS. 3 and 4. In FIG. 3, reference numeral 10 denotes a servo control circuit for making the positional control, reference numeral 11 denotes a motor for making the driving based on a drive control amount from the servo control circuit 10, reference numeral 12 denotes a movable portion within the antenna device to be driven by the motor 11, reference numeral 13 denotes a rate sensor for detecting the angular velocity of rotation of the movable portion 12 around the AZ axis and the EL axis, and reference numeral 14 denotes an angle detector for detecting the AZ angle and the EL angle of the movable portion 12. A drive control amount of the motor 11 for the azimuth angle (AZ angle) and the elevation angle (EL angle) is outputted from the servo control circuit 10. The motor 11 is composed of an azimuth angle drive motor and an elevation angle drive motor, and driven based on the AZ and EL drive control amounts. Reference numeral 15 denotes a displacement gauge group composed of a plurality of measuring instruments for measuring the displacement, which are provided in the first frame structure, the second frame structure and the third frame structure. Reference numeral 16 denotes a metrology correction portion for calculating and outputting the metrology correction amount based on measured data group by the displacement gauge group 15 and angle data by the angle detector 14. And reference numeral 17 denotes an instrumental error correction portion for calculating and outputting the instrumental error correction amount intrinsic to the antenna based on angle data by the angle detector 14.

In the drive control system of the antenna device as shown in FIG. 3, the positional control is performed for an AZ/EL angle command value by feeding back the outputs of the rate sensor 13 and the angle detector 14 to the servo control circuit 10. Further, the metrology correction portion 16 and the instrumental error correction portion 17 make the control for subtracting an offset of the pointing error of antenna due to a deformation of the antenna device from the command value, in which the offset amount mainly includes a mechanical error (instrumental error) that mechanically occurs and an error (metrology error) caused by thermal deformation and deformation due to wind force. The instrumental error correction portion 17 and the metrology correction portion 16 obtain an instrumental error and a metrology error, respectively, to output them as the correction amounts. The instrumental error obtained in the instrumental error correction portion 17 is the pointing error of antenna that mechanically occurs due to various mechanical factors such as a deviation between the AZ drive axis of the antenna device and the vertical direction, a deviation between the EL drive axis and the horizontal direction, and a waviness on the work face of a bearing inner ring 29, for example, with reproducibility. This instrumental error can be obtained beforehand by actually measuring the direction where the antenna is oriented for every set AZ angle and EL angle and calculating the errors $\Delta AZ_K$ and $\Delta EL_K$ between the set AZ angle and EL angle and the measured angles, and $\Delta AZ_K$ and $\Delta EL_K$ may be represented by the functions of AZ angle and EL angle.

Next, a metrology error obtained in the metrology correction portion 16 occurs in the pointing direction of antenna because the antenna device is deformed due to the influence of heat or wind force on the antenna device. This metrology error can be obtained by measuring the displacement amounts of the first frame structure 7 provided in the antenna base portion 1, and the second frame structure 8 and the third frame structure 9 provided in the antenna mount portion 2, using the displacement gauge group composed of plural measuring instruments, and making the arithmetic operation from the measured data group. In FIG. 4, reference numeral 20 denotes a primary metrology error operation portion for estimating a pointing error of the antenna from the measured data group by the displacement gauge group 15, in which $\alpha$ (rotational component around the X axis), $\beta$ (rotational component around the Y axis) and $\gamma$ (rotational component around the Z axis) are obtained by this primary metrology error operation portion 20 to calculate the pointing errors ($\Delta AZ$ and $\Delta EL$) of antenna based on them (a calculation method will be described later). Reference numeral 21 denotes a duplication correction table that stores the pointing errors ($\Delta AZ_C$ and $\Delta EL_C$) of antenna based on $\alpha_C$, $\beta_C$ and $\gamma_C$ calculated by the displacements of the first to third frame structures that mechanically occur according to the AZ angle, in which the pointing errors ($\Delta AZ_C$ and $\Delta EL_C$) have reproducibility. For example, the displacement component of the frame structure due to influence such as waviness or roughness on the work surface of a bearing inner ring 29 is measured, together with the heat and wind force deformation components of the antenna device to be essentially detected, by a first measuring instrument 26, as will be described later. Such pointing errors ($\Delta AZ_C$ and $\Delta EL_C$) of antenna that mechanically occur due to factors such as waviness on the work surface of the bearing inner ring 29 are also obtained as the instrumental errors that are pointing errors that mechanically occur along with the AZ rotation, including a waviness component of the bearing inner ring 29 and a vertical degree of the AZ axis for the antenna in the instrumental error correction portion 17. Accordingly, the metrology correction portion 17 subtracts the pointing errors ($\Delta AZ_c$, $\Delta EL_c$) of antenna outputted from the duplication correction table 21 from the pointing errors ($\Delta AZ$, $\Delta EL$) of antenna outputted from the primary metrology error operation portion 20 so that the pointing errors of antenna that mechanically occur may not overlap in the instrumental error correction and the metrology correction by a subtractor 22. The duplication correction table 21 may be the table storing $\Delta AZ_C$ and $\Delta EL_C$ for every degree of the AZ angle, or may store the functions of AZ angle, if $\Delta AZ_C$ and $\Delta EL_C$ can be represented as those functions. Also, the duplication correction table 21 can be acquired by driving the antenna over one turn of the azimuth angle and recording $\Delta AZ$ and $\Delta EL$ outputted from the primary metrology correction portion 20 for every AZ angle in the time zone when the temperature is relatively constant with less local thermal deformation, and the wind is tender with less deformation due to wind force. In this way, if the output of the duplication correction table 21 is subtracted from the output of the primary metrology correction portion 20 by the subtractor 22, the pointing error component of antenna that mechanically occurs is removed, so that the pointing error of antenna based on thermal deformation and wind deformation of the antenna that essentially occur through the metrology correction is calculated.

The correction amounts obtained by the metrology correction portion 16 and the instrumental error correction portion 17 are added by an adder 18, and the addition result is subtracted from the angle command value (AZ angle and EL angle) by the subtractor 19, thereby removing the error component in the pointing direction of antenna that mechanically occurs and the error component in the pointing direction of antenna due to deformation of the antenna device caused by heat or wind force, so that the driving control in the pointing direction of antenna can be performed at higher precision.

Figure 5:
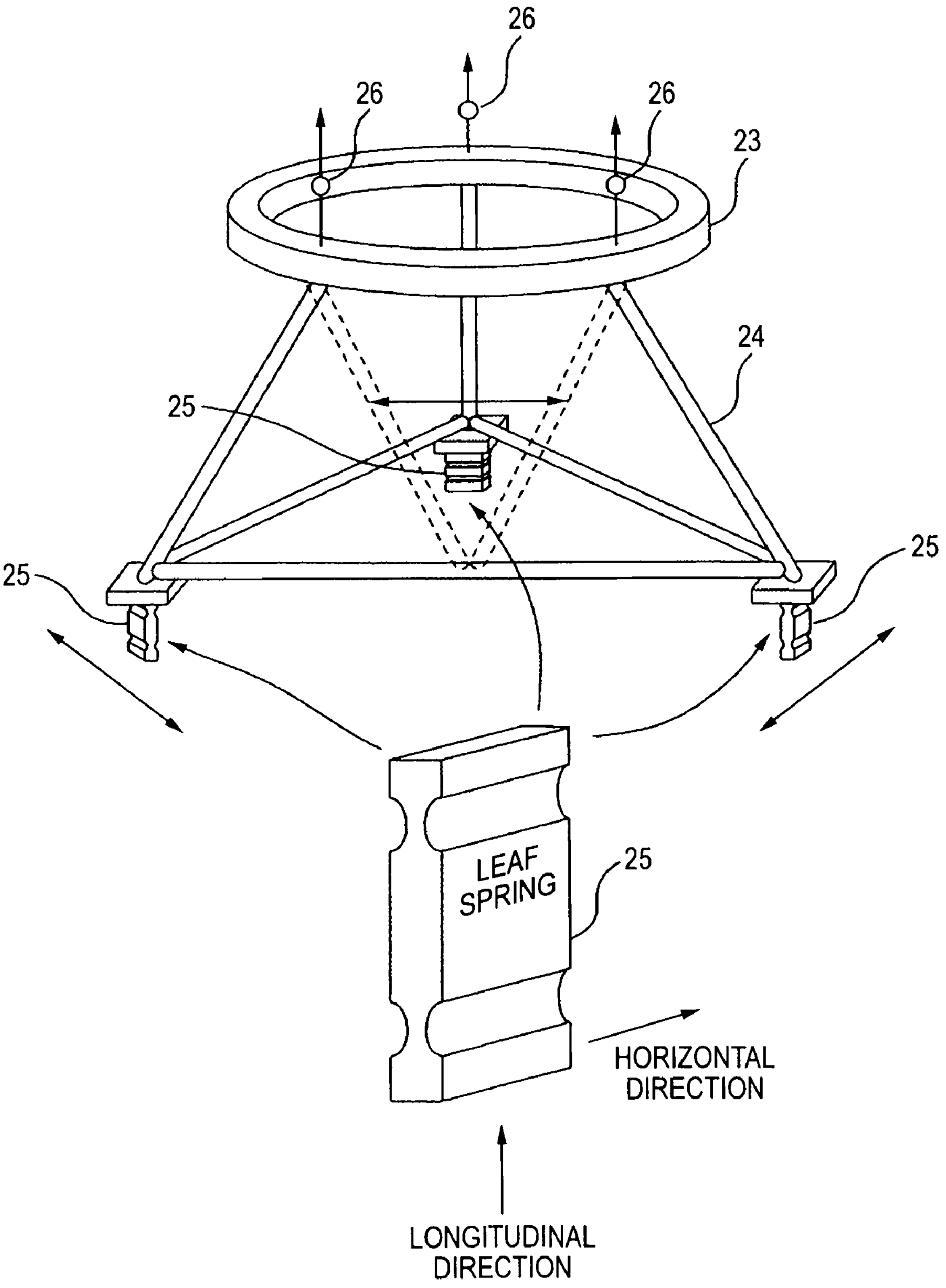
FIG. 5 is a constitutional view showing the constitution of a first frame structure 7 according to the embodiment 1 of this invention.

Next, the constitution of the frame structure and the displacement gauge group 15 and a method for calculating the metrology correction amount will be described below. FIG. 5 is a constitutional view showing the constitution of the first frame structure 7 according to the embodiment 1 of this invention. The first frame structure 7 comprises a ring member 23 and a truss member 24, as shown in FIG. 5. This frame structure may be reinforced to have greater rigidity by the truss member as indicated by the dotted line in FIG. 5. The first frame structure 7 is installed at a position near the part where the antenna base portion 1 is installed on the ground. More specifically, it is installed by disposing the leaf springs 25 of elastic members at three positions. The leaf springs 25 are provided such that the longitudinal direction is the Z axis and the horizontal direction is the circumferential direction around the Z axis (the leaf springs are disposed on this circle), whereby the first frame structure 7 is restrained in only six degrees of freedom by the three lead springs 25. The first measuring instrument 20 is provided on the ring member 23. The first measuring instrument 20 is composed of three contact or contactless displacement measuring devices, in which each measuring device measures the displacement in the Z axis direction.

Figure 6:
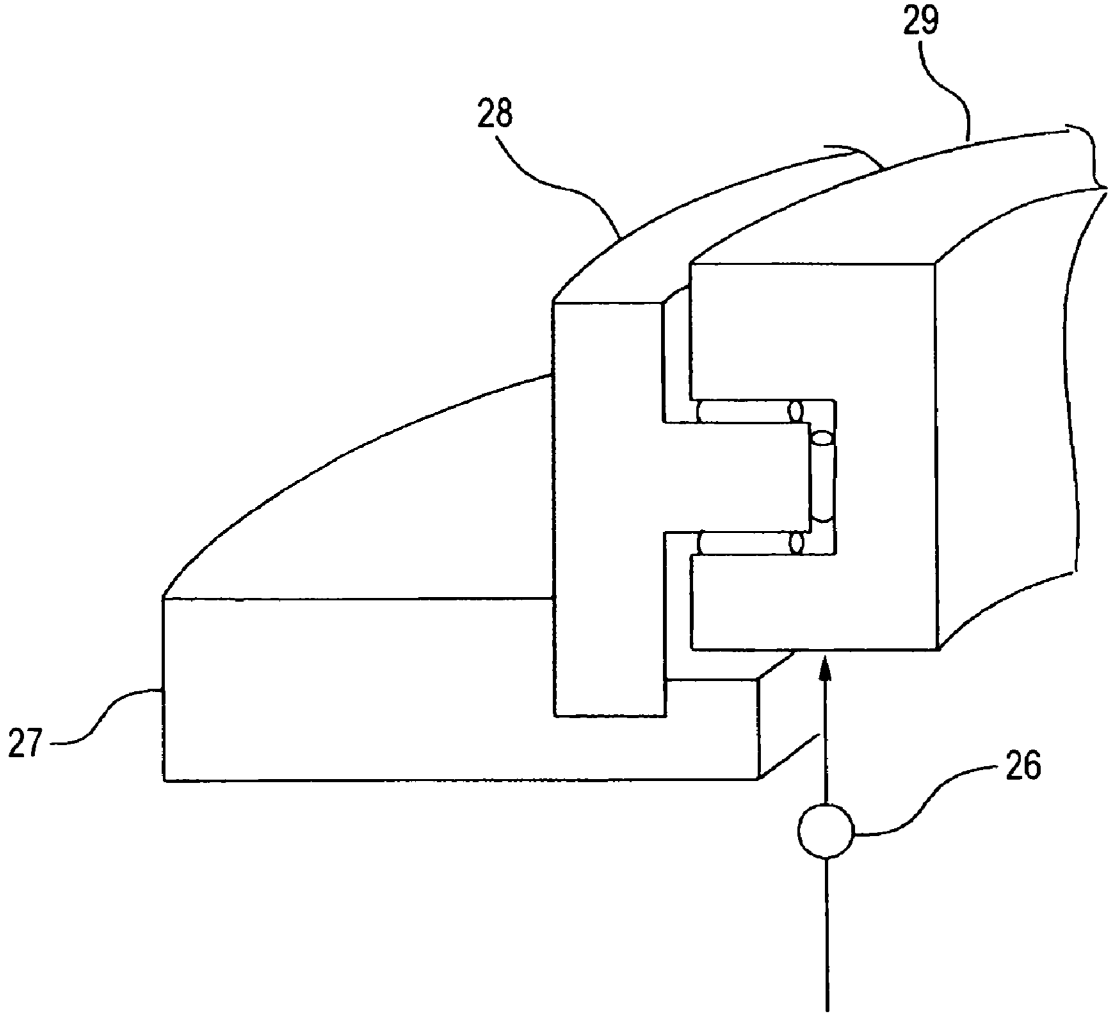
FIG. 6 is an enlarged cross-sectional view of a displacement measuring portion with a first measuring instrument.

FIG. 6 is an enlarged cross-sectional view of a displacement measuring portion for the first measuring instrument 26. Reference numeral 27 denotes a flange of the antenna base portion 1, reference numeral 28 denotes a bearing outer ring fixed to the flange 27, and reference numeral 29 denotes a bearing inner ring connected to the antenna mount portion 2 on the movable side. A roller is disposed between the bearing outer ring 28 and the bearing inner ring 29, so that the bearing inner ring 29 can be smoothly rotated around the azimuth axis with the beating outer ring 28. The first measuring instrument 26 can measure a displacement in the Z axis direction, a rotational displacement θx around the X axis and a rotational displacement θy around the Y axis for the bearing inner ring 29 by measuring the Z axis displacement of the lower surface of the bearing inner ring 29 at three positions. This bearing inner ring 29 serves as a reference member for the antenna mount portion 2, and the attitude of this reference member can be measured by the first measuring instrument 26, whereby the waviness of the bearing or the displacement or inclination of the bottom portion 4 of the antenna mount portion 2 can be measured. By increasing the measuring devices for the first measuring instrument 26, other displacements (displacement in the X axis direction, displacement in the Y axis direction and rotational displacement around the Z axis) can be measured.

Figure 7:
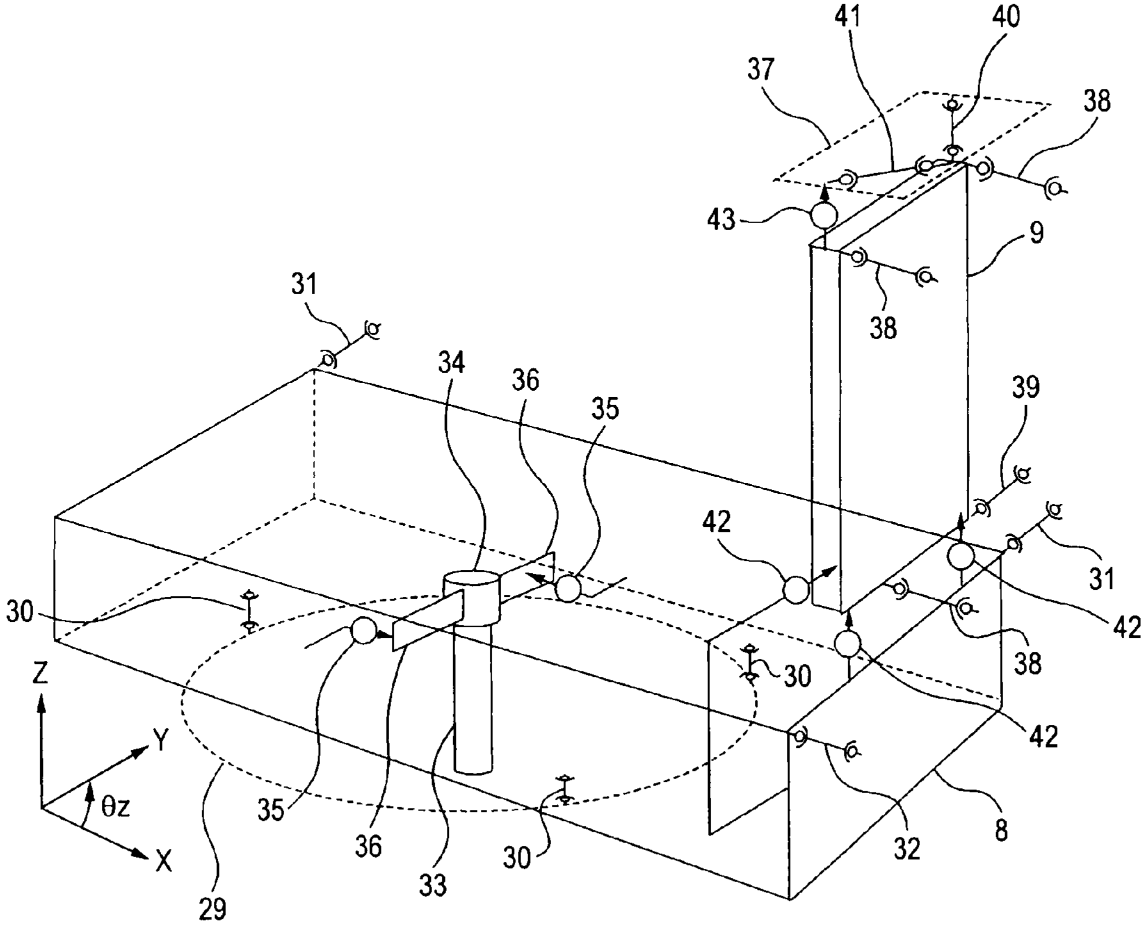
FIG. 7 is a schematic view of a frame structure within an antenna mount portion.

FIG. 7 is a schematic view of the frame structure within the antenna mount portion 2. The second frame structure 8 is stored on the bottom portion 4 of the antenna mount portion 2 and the third frame structure 9 is stored on the strut portion 3 of the antenna mount portion 2. Reference numeral 30 denotes three support members provided in the bearing inner ring 29 that is the reference member of the antenna mount portion 2, and linking the second frame structure 8 to restrain the displacement in the Z direction. The support members 30 are ideally provided in the bearing inner ring 29, but may be provided on a flange of high rigidity secured to the bearing inner ring 29. At this time, the bearing inner ring 29 and the flange may become the reference member. Reference numeral 31 denotes two support members provided in a frame body on the bottom portion 4 of the antenna mount portion 2, and linking the second frame structure 8 to restrain the displacement in the Y direction. Reference numeral 32 denotes one support member provided in the frame body on the bottom portion 4 of the antenna mount portion 2, and linking the second frame structure 8 to restrain the displacement in the X direction. With these support members 30, 31 and 32, the second frame structure is supported on the reference member of the antenna mount portion 2 and the frame body on the bottom portion 4 with only six degrees of freedom restrained.

With this method for restraining the second frame structure 8, a rotational displacement $\theta_Z$ around the Z axis occurs due to a deformation of the frame body on the bottom portion 4 of the antenna mount portion 2, whereby it is required to measure this displacement. In FIG. 7, reference numeral 33 denotes an azimuth axis pole fixed to the ground or the antenna base portion 1 and extending in the Z axis direction, and reference numeral 34 denotes an angle detector (e.g., rotary encoder or resolver) for detecting the rotational angle of the antenna mount portion 2 around the azimuth axis pole 33. The angle detector 34 is firmly fixed on the reference member in the central part on the bottom portion 4 of the antenna mount portion 2, and unsusceptible to a deformation of the frame body on the bottom portion 4 of the antenna mount portion 2. Accordingly, a contact or contactless displacement measuring device 35 is provided in the second frame structure 8 to measure a displacement of the flange 36 provided on the outer circumferential part of the angle detector 34 and convert it into angle, whereby the rotational displacement $\theta_Z$ around the Z axis for the second frame structure 8 can be measured.

In FIG. 7, reference numeral 37 denotes a seat portion of the housing 6 supporting the main reflector 5, which is a support reference member for the main reflector 5. Also, reference numeral 38 denotes three support members provided on the strut portion 3 of the antenna mount portion 2, and linking the third frame structure 9 to restrain the displacement in the X direction. Reference numeral 39 denotes one support member provided in a frame body on the strut portion 3 of the antenna mount portion 2, and linking the third frame structure 9 to restrain the displacement in the Y direction. Reference numeral 40 denotes one support member provided on the seat portion 37, and linking the second frame structure 8 to restrain the displacement in the Z direction. Also, reference numeral 41 denotes one support member provided on the seat portion 37, and linking the third frame structure 9 obliquely within the YZ plane to restrain the rotational displacement around the X axis. With these support members 38, 39, 40 and 41, the third frame structure 9 is supported on the strut portion 3 of the antenna mount portion 2 and the seat portion 37 of the housing 6 with only six degrees of freedom restrained.

With this method for supporting the third frame structure 9, the third frame structure 9 is susceptible to influence of the displacement of the strut portion 3 in the X axis direction, but this displacement scarcely contributes to the pointing direction of antenna, whereby it is not required to measure this displacement component. Reference numeral 42 denotes a second measuring instrument for detecting the attitude of the third frame structure 9 with respect to the second frame structure 8. The second measuring instrument 42 is composed of two contact or contactless displacement measuring devices, provided on the second frame structure 8, for measuring the displacement in the Z axis direction at both ends in the Y axis direction on the bottom portion of the third frame structure 9, and one contact or contactless displacement measuring device, provided on the second frame structure 8, for measuring the displacement in the Y axis direction on the bottom portion of the third frame structure 9, in which these instruments are provided on the right and left strut portions 3. Herein, the attitude of the third frame structure 9 in a perfect sense, namely, all the rotational displacements around the X, Y and Z axes, can not be obtained by the second measuring instrument 42, but the attitude of the third frame structure affecting the pointing direction of antenna can be measured by the second measuring instrument 42, as will be described later.

Also, in FIG. 7, reference numeral 43 denotes a third measuring instrument for measuring the displacement of the seat portion 37 of the housing 6 that is the support reference member of the main reflector 5. The third measuring instrument 43 is composed of one contact or contactless displacement measuring device, provided at an end portion in the Y axis on the top of the third frame structure 9, for measuring the displacement of the seat portion 37 in the Z axis direction, and provided within each of the right and left support portion 3. The third measuring instrument measures the relative displacement of the seat portion 37 relative to the third frame structure 9. Also, the arrangement is such that a support point on the third frame structure 9 with the support member 40 and the support member 41 corresponds to one end portion in the Y axis direction on the top of the third frame structure 9, and the third measuring instrument is provided at the other end portion.

Figure 8:
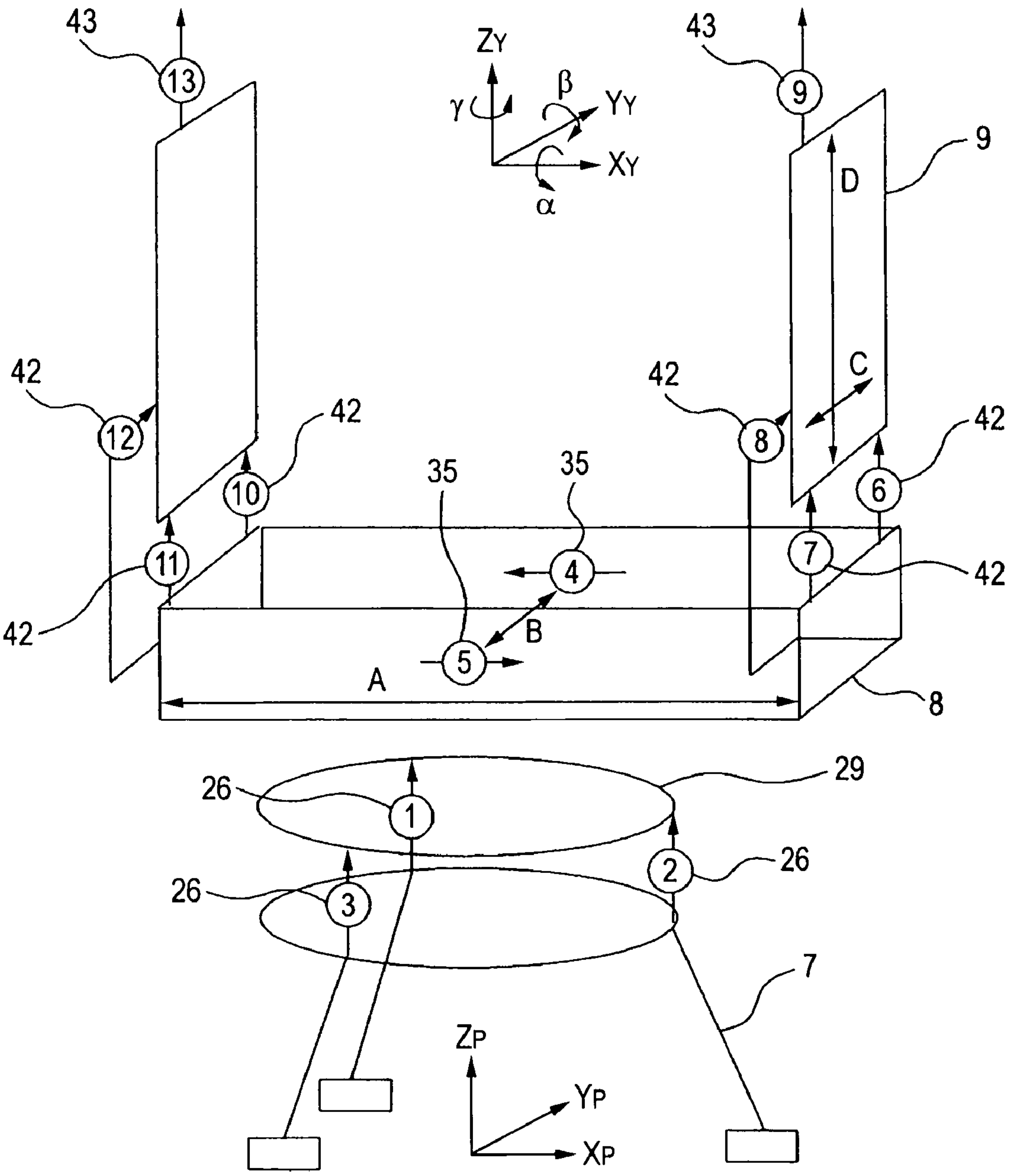
FIG. 8 is a schematic view showing a measurement principle with the first to third measuring instruments.
Figure 9:
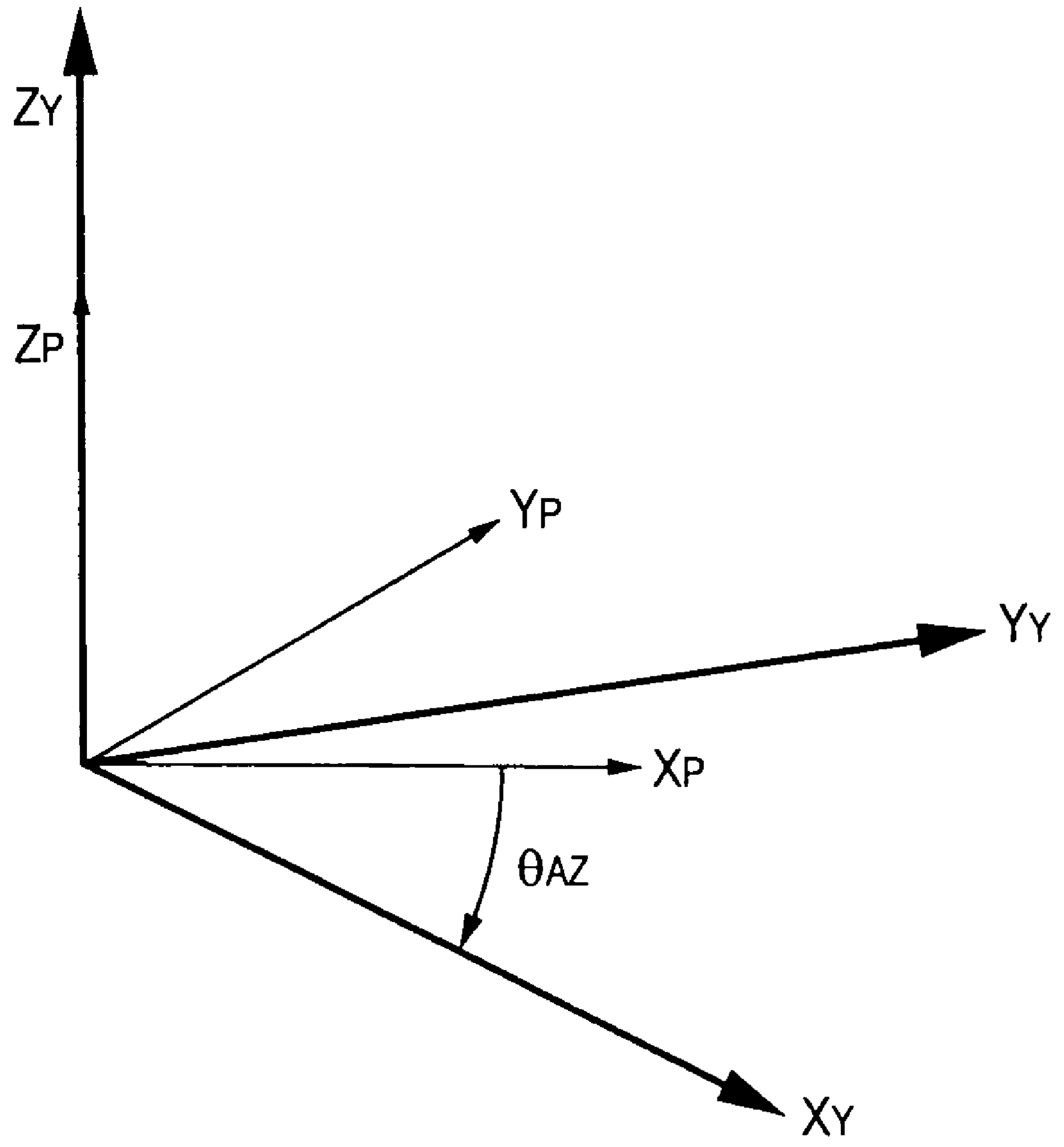
FIG. 9 is a typical view in which a coordinate system ($X_Y$, $Y_Y$, $Z_Y$) is projected to another coordinate system ($X_P$, $Y_P$, $Z_P$).

The displacement gauge group is composed of the first measuring instrument 26, the displacement measuring device 35, the second measuring instrument 42 and the third measuring instrument 43, as shown in FIG. 3. Referring to FIG. 8, a principle for calculating the rotational displacements in the pointing direction of antenna around the X, Y and Z axes based on the measured data group will be described below. A coordinate system ($X_P$, $Y_P$, $Z_P$) fixed on the ground is used in which the origin is a point of intersection between the azimuth axis and the ground and the vertical upward direction is the $Z_P$ direction. Also, a coordinate system ($X_Y$, $Y_Y$, $Z_Y$) is used in which the origin is the middle point (point of intersection between the azimuth axis and the elevation angle) on a line segment virtually tightly coupled with the top (more strictly the housing 6) of the right and left strut portions 3 in the antenna mount portion 2, and the vertical upward direction is the $Z_Y$ direction, the coordinate system being displaced along with the line segment. The elevation axis direction connecting the top of the right and left strut portions 3 is the $X_Y$ direction, and the $X_Y$ direction is parallel to the $X_P$ direction. The $Y_P$ direction and the $Y_Y$ direction are orthogonal to the other two directions in the coordinate system. Also, the antenna mount portion 2 is rotated around the azimuth axis, in which this azimuth angle is defined as $\theta_{AZ}$. FIG. 9 is a typical view in which the coordinate system ($X_Y$, $Y_Y$, $Z_Y$) is projected to the coordinate system ($X_P$, $Y_P$, $Z_P$). For the azimuth angle $\theta_{AZ}$, the positive rotation is defined as the clockwise direction as seen from the positive direction of the $Z_P$ axis to the origin in the coordinate system ($X_P$, $Y_P$, $Z_P$), as shown in FIG. 9. Also, the elevation angle $\theta_{EL}$ of the main reflector 5 is defined such that the zenith direction is at 90 degrees, and the horizontal direction is at 0 degrees.

In FIG. 8, each displacement measuring device is described as the circle sign, and identified with the identification number within the circle sign, and the measured displacement d is represented as $d_1, d_2, \ldots, d_{13}$ with suffixed identification number. In the first measuring instrument 26, the displacement measuring devices with the identification numbers of 1 and 3 are located on the line parallel to the $Y_P$ direction, and symmetrical to respect to the $X_P$ axis. Also, the displacement measuring device with the identification number 2 is located within the $Z_PX_P$ plane. It is assumed that the displacement measuring devices with the identification numbers 1, 2 and 3 are arranged at an equal interval on the circumference of a circle having radius R around the azimuth axis. The displacement measuring device 35 is composed of the displacement measuring devices with the identification numbers 4 and 5, the second measuring instrument 42 is composed of displacement measuring devices with the identification numbers 6, 7, 8, 10, 11 and 12, and the third measuring instrument 43 is composed of the displacement measuring devices with the identification numbers 9 and 13. Also, A to D denote the dimensions of the portions required for calculation, in which A denotes the dimension of the second frame structure 8 in the $X_P$ direction, B denotes the dimension between the displacement measuring devices with the identification numbers 4 and 5, C denotes the dimension between the displacement measuring devices with the identification numbers 6 and 7 and between the displacement measuring devices with the identification numbers 10 and 11, and D denotes the dimension of the third frame structure 9 in the $Z_P$ direction.

With the measurement principle according to the invention, it is possible to calculate the rotational displacement component α of the $X_Y$ axis, the rotational displacement component β of the $Y_Y$ axis, and the rotational displacement component γ of the $Z_Y$ axis in the coordinate system ($X_Y$, $Y_Y$, $Z_Y$) that occur due to a deformation of the antenna mount portion 2. Further, it is possible to convert them into the azimuth angle displacement ΔAZ and the elevation angle displacement ΔEL.

First of all, the inclination of the reference member (bearing inner ring 29 as shown in FIGS. 6 and 7) in the antenna mount portion 2 is calculated. Denoting the inclination around the $X_P$ axis as $RotX_P$, and the inclination around the $Y_P$ axis as $RotY_P$, these inclinations are obtained from $d_1$, $d_2$ and $d_3$ measured by the displacement measuring devices with the identification numbers 1 to 3 using the following expressions.

$$Rot\ X_p = \frac{d_1 - d_3}{\sqrt{3}\,R} \qquad \text{[Numerical expression 1]}$$

$$Rot\ Y_p = \frac{\frac{d_1 + d_3}{2} - d_2}{\frac{3}{2}R}$$

The contributions $\alpha_B$, $\beta_B$ and $\gamma_B$ to the rotational displacement components α, β and γ with Rot $X_P$ and Rot $Y_P$ can be obtained from the following expressions.

$$\alpha_B = Rot\ X_P \times \cos\theta_{AZ} - Rot\ Y_P \times \sin\theta_{AZ}$$

$$\beta_B = Rot\ Y_P \times \cos\theta_{AZ} + Rot\ X_P \times \sin\theta_{AZ}$$

$$\gamma_B = 0 \qquad \text{[Numerical expression 2]}$$

Deformation of the bottom portion 4 of the antenna mount portion 2 and the strut portion 3 will be considered. The contribution $\gamma_{Y1}$ to the rotational displacement component γ due to a deformation of the frame body on the bottom portion 4 of the antenna mount portion 2 can be obtained from $d_4$ and $d_5$ measured by the displacement measuring devices with the identification numbers 4 and 5 using the following expression.

$$\gamma_{Y1} = \frac{d_4 + d_5}{B}$$ [Numerical expression 3]

A difference in the height between the right and left strut portions 3 is obtained from $d_6$, $d_7$, $d_9$, $d_{10}$, $d_{11}$ and $d_{13}$ measured by the displacement measuring devices with the identification numbers 6, 7, 9, 10, 11 and 13, contributing to the rotational displacement component β, in which the contribution amount $\beta_Y$ is obtained from the following expression.

$$\beta_Y = \frac{\frac{d_{10} + d_{11} + d_{13}}{2} - \frac{d_6 + d_7 + d_9}{2}}{A}$$ [Numerical expression 4]

Also, the displacements of the right and left strut portions 3 in the $Y_Y$ direction can be obtained from $d_6$, $d_7$, $d_8$, $d_{10}$, $d_{11}$ and $d_{12}$ measured by the displacement measuring devices with the identification numbers 6, 7, 8, 10, 11 and 12, and the contribution $\gamma_{Y2}$ to the rotational displacement component γ is obtained based on a difference between them, using the following expression.

$$\gamma_{Y2} = \frac{\left\{\frac{D}{C}(d_7 - d_6) + d_8\right\} - \left\{\frac{D}{C}(d_{11} - d_{10}) + d_{12}\right\}}{A}$$ [Numerical expression 5]

Also, the inclination of the seat portion 37 of the housing 6 supporting the elevation axis (contributing to the rotational displacement component α) is obtained from $d_9$ and $d_{13}$ measured by the displacement measuring devices with the identification numbers 9 and 13. Herein, one of the right and left housings 6 is usually provided with a drive positioning device, and the other housing is provided for free rotation, whereby only the inclination of the housing 6 on the side of the drive positioning device contributes to the rotational displacement component α. Supposing that the drive positioning device is provided on the side of the housing 6 measured by the displacement measuring device with the identification number 9, the contribution $\alpha_Y$ to the rotational displacement component α is obtained from the inclination of the housing 6 using the following expression.

$$\alpha_Y = \frac{d_6 - d_7 - d_9}{C}$$ [Numerical expression 6]

From the simple summation based on $\alpha_B$, $\beta_B$, $\gamma_B$, $\alpha_Y$, $\beta_Y$, $\gamma_{Y1}$ and $\gamma_{Y2}$ as calculated in the above way, the rotational displacement components α, β and γ can be obtained using the following expressions.

$$\alpha = \alpha_B + \alpha_Y$$ [Numerical expression 7]

$$\beta = \beta_B + \beta_Y$$

$$\gamma = \gamma_B + \gamma_Y = \gamma_{Y1} + \gamma_{Y2}$$

Then, the pointing errors ΔAZ and ΔEL of antenna are obtained from the rotational displacement components α, β and γ. Since the rotational displacement component α is directly added to ΔEL, β is added to ΔAZ depending on the elevation angle $\theta_{EL}$ of the main reflector 5, and γ is reversed in the sign, and added to ΔAZ, whereby ΔAZ and ΔEL can be obtained using the following expressions.

$$\Delta EL = \alpha$$

$$\Delta AZ = \beta \times \tan \theta_{EL} - \gamma$$ [Numerical expression 8]

As described above, with the invention, the pointing error of antenna can be calculated based on the displacement measured by each displacement measuring device, whereby it is possible to make the positional control in the pointing direction of antenna more accurately by calculating the error component (metrology correction amount) in the pointing direction of antenna caused by thermal deformation and deformation due to wind force, except for the displacement amount that mechanically occurs in the frame structure, by the metrology correction portion 16 in the tracking control system as shown in FIGS. 3 and 4. Also, the first frame structure 7 is supported by the elastic member, and the second frame structure 8 and the third frame structure 9 are restrained in six degrees of freedom, without excessive restraint, whereby each of the structures can be prevented from being internally deformed by suppressing the load flowing through these structures, and the accuracy of displacement measurement by each displacement measuring device can be increased.

Embodiment 2

An antenna device according to an embodiment 2 of this invention will be described below with reference to FIGS. 10 to 12. The antenna device according to the embodiment 2 is different in the supporting method for the second frame structure 8 and the third frame structure 9 and the measuring method for the third measuring instrument (third measuring instrument 43 in the embodiment 1) from the antenna device according to the embodiment 1. On the other hand, the cross-section of the antenna device as shown in FIGS. 1 and 2, the drive control system of the antenna device as shown in FIG. 3, the constitution of the metrology correction portion as shown in FIG. 4, the constitution of the first frame structure 7 as shown in FIG. 5, and the constitution of the displacement measuring portion with the first measuring instrument as shown in FIG. 6, for the antenna device according to the embodiment 2 are the same as for the antenna device according to the embodiment 1. Accordingly, the constitution, operation and effect of the antenna device according to the embodiment 2 are the same as or equivalent to the constitution, operation and effect of the antenna device as described in the embodiment 1 using FIGS. 1 to 6, unless specifically noted in the embodiment 2.

The constitution of the first frame structure 7 and the first measuring instrument 26 according to the embodiment 2 is the same as the embodiment 1 described using FIGS. 5 and 6, and their explanation is omitted. FIG. 10 is a schematic view of the frame structure within the antenna mount portion according to the embodiment 2 of the invention. FIG. 11 is an appearance view of the support member for supporting the second frame structure according to the embodiment 2 of this invention. FIG. 12 is a schematic view showing a measurement principle. The second frame structure 8 is stored on the bottom portion 4 of the antenna mount portion 2 and the third frame structure 9 is stored on the strut portion 3 of the antenna mount portion 2. In FIG. 10, reference numeral 44 denotes three support members provided in the bearing inner ring 29 that is the reference member of the antenna mount portion 2, and linking the second frame structure 8 to restrain the displacement in the Z direction. The support members 44 are ideally provided in the bearing inner ring 29, but may be provided on a flange of high rigidity secured to the bearing inner ring 29. At this time, the bearing inner ring 29 and the flange may become the reference member. Herein, the support member 44 has a bipod structure as shown in FIG. 12. The bipod structure is a support mechanism in which only the Z direction and the θ direction are restrained in six degrees of freedom but the rotation around the R axis is not restrained. Using the bipod structure, the inclination of the second frame structure 8 can be made coincident with the bearing inner ring 29. The bearing (composed of the bearing outer ring 28, the bearing inner ring 29 and the roller) for rotatably supporting the antenna is varied in the axial or Z-axis (height) direction, so that the bearing inner ring 29 is inclined, depending on the supporting method for the antenna mount portion 2. If the second frame structure 8 is supported by the member such as the leaf spring 12, the rotation around the R axis is restrained at each of three support points, and over-restrained, so that the second frame structure 8 is distorted to make the inclination of the second frame structure 8 unmatched with the bearing inner ring 29. Thus, the support members 44 of the bipod structure are employed at the three points where the second frame structure 8 is supported from the bearing inner ring 29, as shown in FIG. 11. With the support members 44 provided at the three positions, the second frame structure is supported on the reference member of the antenna mount portion 2, with only six degrees of freedom restrained.

With this method for restraining the second frame structure 8, the deformation of the frame body on the bottom portion 4 of the antenna mount portion 2 does not have ideally influence on the displacement of the second frame structure 8. But there is possibility that the displacement due to inclination of the bearing inner ring 38 may arise, whereby the rotational displacement $\theta_Z$ around the Z axis of the second frame structure 8 is measured. In FIG. 7, reference numeral 45 denotes an azimuth axis pole fixed to the ground or the antenna base portion 1 and extending in the Z axis direction, and reference numeral 46 denotes an angle detector (e.g., rotary encoder or resolver) for detecting the rotational angle of the antenna mount portion 2 around the azimuth axis pole 45. The angle detector 46 is firmly fixed on the reference member in the central part on the bottom portion 4 of the antenna mount portion 2, and unsusceptible to a deformation of the frame body on the bottom portion 4 of the antenna mount portion 2. Accordingly, a contact or contactless displacement measuring device 47 is provided in the second frame structure 8 to measure a displacement of the flange 48 provided on the outer circumferential part of the angle detector 46 and convert it into angle, whereby the rotational displacement $\theta_Z$ around the Z axis for the second frame structure 8 can be measured.

Figure 10:
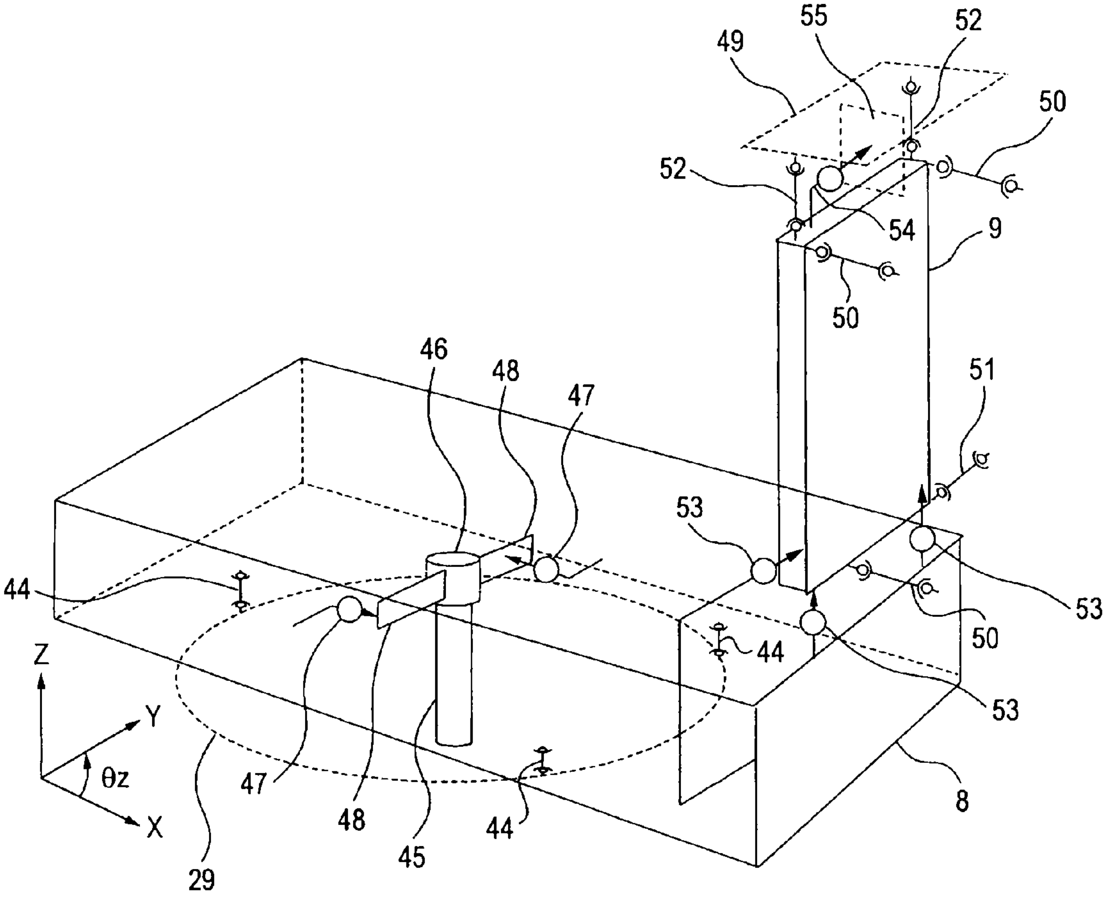
FIG. 10 is a schematic view of the frame structure within the antenna mount portion according to an embodiment 2 of the invention.
Figure 11:
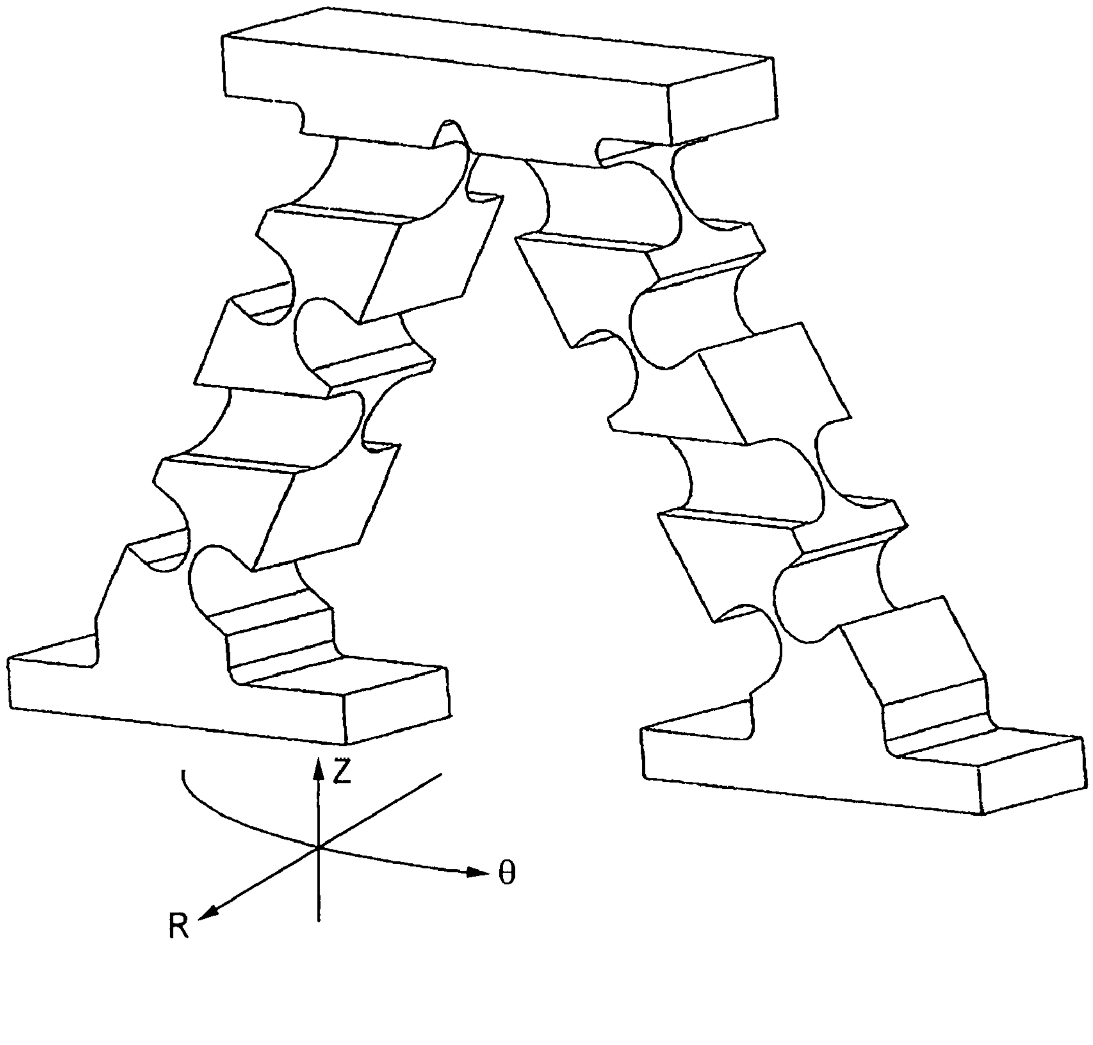
FIG. 11 is an appearance view of a support member for supporting the second frame structure according to the embodiment 2 of this invention.

In FIG. 10, reference numeral 49 denotes a seat portion of the housing 6 supporting the main reflector 5, which is a support reference member for the main reflector 5. Also, reference numeral 50 denotes three support members provided on the strut portion 3 of the antenna mount portion 2, and linking the third frame structure 9 to restrain the displacement in the X direction. Reference numeral 51 denotes one support member provided in a frame body on the strut portion 3 of the antenna mount portion 2, and linking the third frame structure 9 to restrain the displacement in the Y direction. Reference numeral 52 denotes two support members provided on the seat portion 49, and linking the second frame structure 8 to restrain the displacement in the Z direction. The two support members 52 are a parallel link mechanism, which restrains the displacement in the Z direction and the rotational displacement around the X axis, so that the third frame structure 9 is always kept in a parallel positional relation with the seat portion 49. Also, the third frame structure 9 is supported by the support members 52, the rotational (α rotation) rigidity around the X axis of the third frame structure 9 can be greater than where the third frame structure 9 is supported by the support members 40 and 41 in the embodiment 1. With these support members 50, 51 and 52, the third frame structure 9 is supported on the support portion 3 of the antenna mount portion 2 and the seat portion 49 of the housing 6 with only six degrees of freedom restrained.

With this method for supporting the third frame structure 9, the third frame structure 9 is susceptible to influence of the displacement of the strut portion 3 in the X axis direction, but this displacement scarcely contributes to the pointing direction of antenna, whereby it is not required to measure this displacement component. Reference numeral 53 denotes a second measuring instrument for detecting the attitude of the third frame structure 9 with respect to the second frame structure 8. The second measuring instrument 53 is composed of two contact or contactless displacement measuring devices, provided on the second frame structure 8, for measuring the displacement in the Z axis direction at both ends in the Y axis direction on the bottom portion of the third frame structure 9, and one contact or contactless displacement measuring device, provided on the second frame structure 8, for measuring the displacement in the Y axis direction on the bottom portion of the third frame structure 9, in which these instruments are provided on the right and left strut portions 3. Herein, the attitude of the third frame structure 9 in a perfect sense, namely, all the rotational displacements around the X, Y and Z axes, can not be obtained by the second measuring instrument 53, but the attitude of the third frame structure affecting the pointing direction of antenna can be measured by the second measuring instrument 53, as will be described later.

Also, in FIG. 10, reference numeral 54 denotes a third measuring instrument for measuring the displacement of the seat portion 49 of the housing 6 that is the support reference member of the main reflector 5. The third measuring instrument 54 is composed of one contact or contactless displacement measuring device, provided on the top of the third frame structure 9, for measuring the displacement of the seat portion 49 in the Y axis direction, and provided within each of the right and left support portions 3. The third measuring instrument 54 measures the relative displacement of the flange 55 displaced rigidly with the seat portion 49 relative to the third frame structure 9.

The displacement gauge group is composed of the first measuring instrument 26, the displacement measuring device 47, the second measuring instrument 53 and the third measuring instrument 54, as shown in FIG. 3. Referring to FIG. 12, a principle for calculating the rotational displacements in the pointing direction of antenna around the X, Y and Z axes based on the measured data group will be described below. A coordinate system ($X_P$, $Y_P$, $Z_P$), a coordinate system ($X_Y$, $Y_Y$, $Z_Y$), an azimuth angle $\theta_{AZ}$ and an elevation angle $\theta_{EL}$ are the same as in the embodiment 1 described using FIG. 9, and their explanation is omitted.

Figure 12:
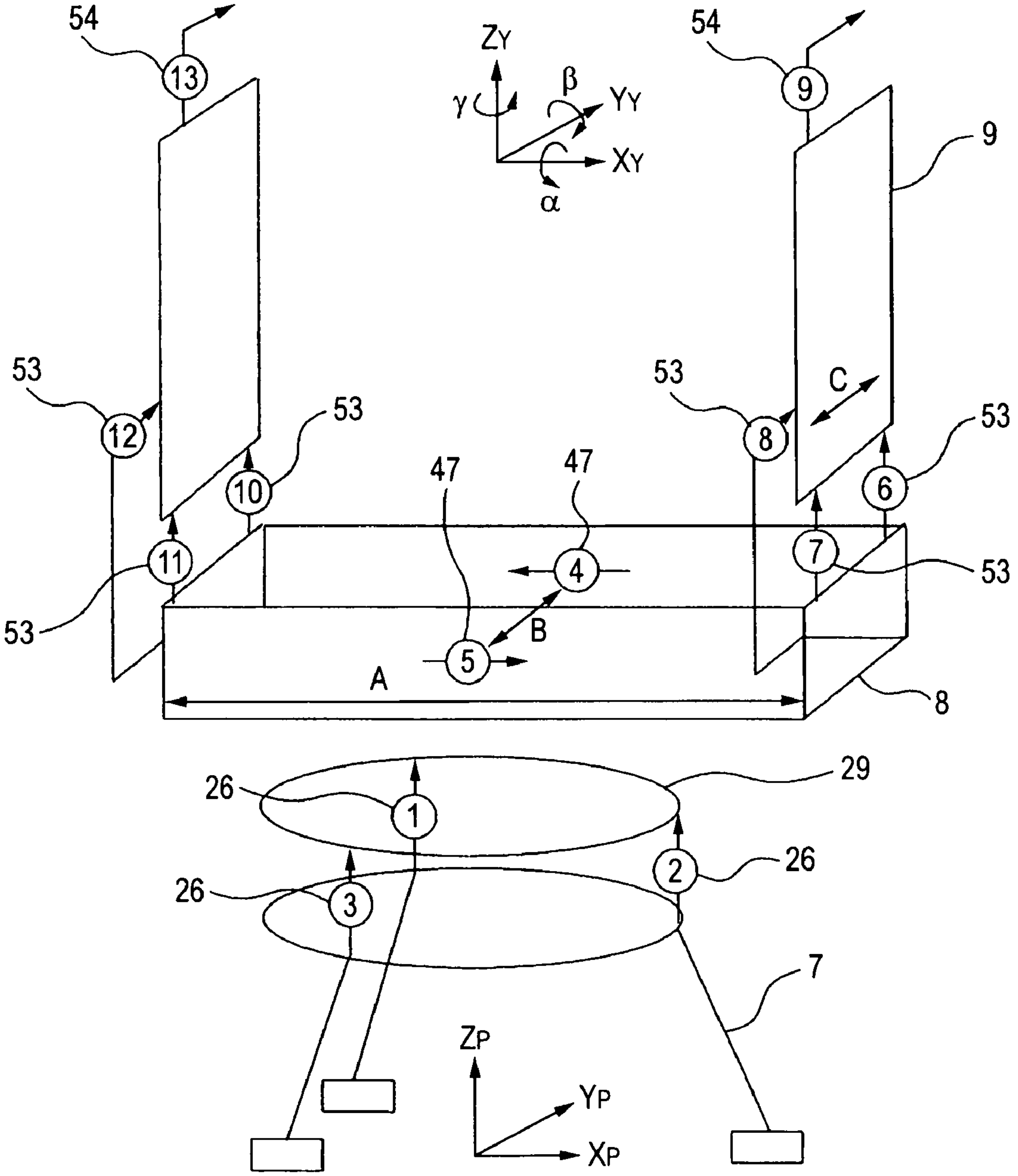
FIG. 12 is a schematic view showing a measurement principle with the first to third measuring instruments.

In FIG. 12, each displacement measuring device is described as the circle sign, and identified with the identification number within the circle sign, and the measured displacement d is represented as $d_1, d_2, \ldots, d_{13}$ with suffixed identification number. In the first measuring instrument 26, the displacement measuring devices with the identification numbers of 1 and 3 are located on the line parallel to the $Y_P$ direction, and in a positional relation symmetrical to the $X_P$ axis. Also, the displacement measuring device with the identification number 2 is located within the $Z_PX_P$ plane. It is assumed that the displacement measuring devices with the identification numbers 1, 2 and 3 are arranged at an equal interval on the circumference of a circle having radius R around the azimuth axis. The displacement measuring device 47 is composed of displacement measuring devices with the identification numbers 4 and 5, the second measuring instrument 53 is composed of the displacement measuring devices with the identification numbers 6, 7, 8, 10, 11 and 12, and the third measuring instrument 54 is composed of the displacement measuring devices with the identification numbers 9 and 13. Also, A to C denote the dimensions of the portions required for calculation, in which A denotes the dimension of the second frame structure 8 in the $X_P$ direction, B denotes the dimension between the displacement measuring devices with the identification numbers 4 and 5, and C denotes the dimension between the displacement measuring devices with the identification numbers 6 and 7 and between the displacement measuring devices with the identification numbers 10 and 11. Also, the coefficient M is the coefficient of displacement amount in the Y direction per unit rotation (α rotation) of the third frame structure, and mainly decided by a ratio of the height (Z direction) of the third frame structure to the length of the support member 52 in the third frame structure. More particularly, it is the coefficient for correcting the output value at the α rotation in the displacement measuring devices with the identification numbers 8 and 11 for detecting the displacement in the Y direction.

With the measurement principle according to the invention, it is possible to calculate the rotational displacement component α of the $X_Y$ axis, the rotational displacement component β of the $Y_Y$ axis, and the rotational displacement component γ of the $Z_Y$ axis in the coordinate system ($X_Y$, $Y_Y$, $Z_Y$) that occur due to a deformation of the antenna mount portion 2. Further, it is possible to convert them into the azimuth angle displacement ΔAZ and the elevation angle displacement ΔEL.

First of all, the inclination of the reference member (bearing inner ring 29 as shown in FIGS. 6 and 7) in the antenna mount portion 2 is calculated. Denoting the inclination around the $X_P$ axis as $RotX_P$, and the inclination around the $Y_P$ axis as $RotY_P$, these inclinations are obtained from $d_1$, $d_2$ and $d_3$ measured by the displacement measuring devices with the identification numbers 1 to 3 using the following expressions.

$$Rot\ X_p = \frac{d_1 - d_3}{\sqrt{3}\,R} \qquad \text{[Numerical expression 9]}$$

$$Rot\ Y_p = \frac{\frac{d_1 + d_3}{2} - d_2}{\frac{3}{2}R}$$

The contributions $\alpha_B$, $\beta_B$ and $\gamma_B$ to the rotational displacement components α, β and γ with $RotX_P$ and $RotY_P$ can be obtained from the following expressions.

$$\alpha_B = Rot\ X_P \times \cos\theta_{AZ} - Rot\ Y_P \times \sin\theta_{AZ}$$

$$\beta_B = Rot\ Y_P \times \cos\theta_{AZ} + Rot\ X_P \times \sin\theta_{AZ}$$

$$\gamma_B = 0 \qquad \text{[Numerical expression 10]}$$

Deformation of the bottom portion 4 of the antenna mount portion 2 and the strut portion 3 will be considered. The contribution $\gamma_{Y1}$ to the rotational displacement component γ due to a deformation of the frame body on the bottom portion 4 of the antenna mount portion 2 can be obtained from $d_4$ and $d_5$ measured by the displacement measuring devices with the identification numbers 4 and 5 using the following expression.

$$\gamma_{Y1} = \frac{d_4 + d_5}{B} \qquad \text{[Numerical expression 11]}$$

A difference in the height between the right and left strut portions 3 is obtained from $d_6$, $d_7$, $d_{10}$ and $d_{11}$ measured by the displacement measuring devices with the identification numbers 6, 7, 10 and 11, contributing to the rotational displacement component β, in which the contribution amount $\beta_Y$ is obtained from the following expression.

$$\beta_Y = \frac{\frac{d_{10} + d_{11}}{2} - \frac{d_6 + d_7}{2}}{A} \qquad \text{[Numerical expression 12]}$$

Also, the displacements of the right and left strut portions 3 in the $Y_Y$ direction can be obtained from $d_6$, $d_7$, $d_8$, $d_9$, $d_{10}$, $d_{11}$, $d_{12}$ and $d_{13}$ measured by the displacement measuring devices with the identification numbers 6, 7, 8, 9, 10, 11, 12 and 13, and the contribution $\gamma_{Y2}$ to the rotational displacement component γ is obtained based on a difference between them, using the following expression.

$$\gamma_{Y2} = \frac{\left\{d_8 + d_9 - \frac{M}{C}(d_6 - d_7)\right\} - \left\{d_{12} + d_{13} - \frac{M}{C}(d_{10} - d_{11})\right\}}{A} \qquad \text{[Numerical expression 13]}$$

Also, the inclination of the seat portion 49 of the housing 6 supporting the elevation axis (contributing to the rotational displacement component α) is obtained from $d_9$ and $d_{13}$ measured by the displacement measuring devices with the identification numbers 9 and 13. Herein, one of the right and left housings 6 is usually provided with a drive positioning device, and the other housing is provided for free rotation, whereby only the inclination of the housing 6 on the side of the drive positioning device contributes to the rotational displacement component α. Supposing that the drive positioning device is provided on the side of the housing 6 measured by the displacement measuring device with the identification number 9, the contribution $\alpha_Y$ to the rotational displacement component α is obtained from the inclination of the housing 6 using the following expression.

$$\alpha_Y = \frac{d_6 - d_7}{C} \qquad \text{[Numerical expression 14]}$$

From the simple summation based on $\alpha_B$, $\beta_B$, $\gamma_B$, $\alpha_Y$, $\beta_Y$, $\gamma_{Y1}$ and $\gamma_{Y2}$ as calculated in the above way, the rotational displace ment components $\alpha$, $\beta$ and $\gamma$ can be obtained using the following expressions.

$$\alpha=\alpha_B+\alpha_Y$$

$$\beta=\beta_B+\beta_Y$$

$$\gamma=\gamma_B+\gamma_{Y=\gamma Y1}+\gamma_{Y2} \quad \text{[Numerical expression 15]}$$

Then, the pointing errors $\Delta AZ$ and $\Delta EL$ of antenna are obtained from the rotational displacement components $\alpha$, $\beta$, and $\gamma$. Since the rotational displacement component $\alpha$ is directly added to $\Delta EL$, $\beta$ is added to $\Delta AZ$ depending on the elevation angle $\theta_{EL}$ of the main reflector 5, and $\gamma$ is reversed in the sign, and added to $\Delta AZ$, whereby $\Delta AZ$ and $\Delta EL$ can be obtained using the following expressions.

$$\Delta EL=\alpha$$

$$\Delta AZ=\beta\times\tan\theta_{EL}-\gamma \quad \text{[Numerical expression 16]}$$

Herein, $\beta$ is fully smaller than 1, and the elevation angle $\theta_{EL}$ is fully smaller than $\pi/2$.

As described above, with the invention, the pointing error of antenna can be calculated based on the displacement measured by each displacement measuring device, whereby it is possible to make the positional control in the pointing direction of antenna more accurately by calculating the error component (metrology correction amount) in the pointing direction of antenna caused by thermal deformation and deformation due to wind force, except for the displacement amount that mechanically occurs in the frame structure, by the metrology correction portion 16 in the tracking control system as shown in FIGS. 3 and 4. Also, the first frame structure 7 is supported by the elastic member, and the second frame structure 8 is supported by the support member of bipod structure, and the third frame structure 9 is supported using the parallel link mechanism from the seat plane, each restrained in six degrees of freedom, each frame structure without excessive restraint, whereby each of the structures can be prevented from being internally deformed by suppressing the load flowing through these structures, and the accuracy of displacement measurement by each displacement measuring device can be increased.

What is claimed is:

1. An antenna device comprising:

an antenna base portion;

an antenna mount portion which is supported by the antenna base portion and rotated around an azimuth axis and which supports a main reflector with two struts;

a frame structure group including a plurality of frame structures which are provided in the antenna base portion and the antenna mount portion, with six degrees of freedom restrained, respectively;

a displacement gauge group which measures a displacement of the frame structure group;

a metrology correction portion which calculates a pointing error of an antenna based on measured data of the displacement gauge group and calculates a metrology correction amount by removing an error amount arising depending on an azimuth angle from the calculated pointing error; and a control circuit which controls a driving of the antenna by correcting a drive command value of the antenna with the metrology correction amount.

2. The antenna device according to claim 1, wherein the frame structure group comprises:

a first frame structure provided in the antenna base portion and supported by an elastic member;

a second frame structure provided at three points on a reference member of the antenna mount portion with a Z-axis displacement restrained and with six degrees of freedom restrained; and a third frame structure provided on the strut of the antenna mount portion with six degrees of freedom restrained, and wherein the displacement gauge group comprises:

a first measuring instrument which measures an attitude of the reference member of the antenna mount portion with respect to the first frame structure;

a second measuring instrument which measures an attitude of the third frame structure with respect to the second frame structure; and a third measuring instrument which measures a displacement of a support reference member of the main reflector with respect to the third frame structure.

3. The antenna device according to claim 2, wherein the first measuring instrument includes three displacement measuring devices which are provided at three points on the first frame structure and measures the Z-axis direction displacement at three points of the reference member of the antenna mount portion.

4. The antenna device according to claim 2, wherein the second measuring instrument includes:

two displacement measuring devices which are provided at two points on the second frame structure and measures the Z-axis direction displacement at two points of the third frame structure; and one displacement measuring device which is provided at one point on the second frame structure and measures the Y-axis direction displacement at one point of the third frame structure.

5. The antenna device according to claim 2, wherein the third measuring instrument includes one displacement measuring device which is provided at one point on the third frame structure and which measures the Z-axis direction displacement at one point of the support reference member of the main reflector.

6. The antenna device according to claim 1, wherein the frame structure group comprises:

a first frame structure provided in the antenna base portion and supported by an elastic member;

a second frame structure provided at three points on a reference member of the antenna mount portion and supported by a support member of a bipod structure; and a third frame structure provided on the struts of the antenna mount portion with six degrees of freedom restrained, and wherein the displacement gauge group comprises:

a first measuring instrument which measures an attitude of the reference member of the antenna mount portion with respect to the first frame structure;

a second measuring instrument which measures an attitude of the third frame structure with respect to the second frame structure; and a third measuring instrument which measures a displacement of a support reference member of the main reflector with respect to the third frame structure.

7. The antenna device according to claim 6, wherein the third frame structure is supported by a parallel link mechanism from the support reference member of the main reflector.

8. The antenna device according to claim 6, wherein the third measuring instrument includes one displacement measuring instrument which is provided at one point on the third frame structure and measures a Y-axis direction displacement at one point of the support reference member of the main reflector.

9. An antenna device comprising:

an antenna base portion;

an antenna mount portion which is supported by the antenna base portion and rotated around an azimuth axis and which supports a main reflector with two struts;

a frame structure group including a plurality of frame structures which are provided in the antenna base portion and the antenna mount portion, with six degrees of freedom restrained, respectively;

a displacement gauge group which measures the displacement of the frame structure group;

a metrology correction portion which calculates a pointing error of an antenna based on measured data of the displacement gauge group and calculates a metrology correction amount by removing an error amount arising depending on an azimuth angle from the calculated pointing error;

an instrumental error correction portion which outputs an instrumental error that is a pointing error of the antenna arising depending on the azimuth angle; and a control circuit which controls a driving of the antenna by correcting a drive command value of the antenna with the metrology correction amount and the instrumental error.

10. The antenna device according to claim 9, wherein the frame structure group comprises:

a first frame structure provided in the antenna base portion and supported by an elastic member;

a second frame structure provided at three points on a reference member of the antenna mount portion with a Z-axis displacement restrained and with six degrees of freedom restrained; and a third frame structure provided on the strut of the antenna mount portion with six degrees of freedom restrained, and wherein the displacement gauge group comprises:

a first measuring instrument which measures an attitude of the reference member of the antenna mount portion with respect to the first frame structure;

a second measuring instrument which measures an attitude of the third frame structure with respect to the second frame structure; and a third measuring instrument which measures the displacement of a support reference member of the main reflector with respect to the third frame structure.

11. The antenna device according to claim 9, wherein the frame structure group comprises:

a first frame structure provided in the antenna base portion and supported by an elastic member;

a second frame structure provided at three points on a reference member of the antenna mount portion and supported by a support member of a bipod structure; and a third frame structure provided on the struts of the antenna mount portion with six degrees of freedom restrained, and wherein the displacement gauge group comprises:

a first measuring instrument which measures an attitude of the reference member of the antenna mount portion with respect to the first frame structure;

a second measuring instrument which measures an attitude of the third frame structure with respect to the second frame structure; and a third measuring instrument which measures a displacement of a support reference member of the main reflector with respect to the third frame structure.

12. An antenna device comprising:

an antenna base portion;

an antenna mount portion which is supported by the antenna base portion and rotated around an azimuth axis and which supports a main reflector with two struts;

a first frame structure provided in the antenna base portion and supported by an elastic member;

a first measuring instrument which measures an attitude of a reference member of the antenna mount portion with respect to the first frame structure;

a second frame structure provided at three points on the reference member of the antenna mount portion and supported by a support member of a bipod structure;

a third frame structure provided on the struts of the antenna mount portion with six degrees of freedom restrained;

a second measuring instrument which measures an attitude of the third frame structure with respect to the second frame structure; and a third measuring instrument which measures a displacement of a support reference member of the main reflector with respect to the third frame structure.

13. The antenna device according to claim 12, wherein the third frame structure is supported by a parallel link mechanism from the support reference member of the main reflector.

14. The antenna device according to claim 13, wherein the third measuring instrument includes one displacement measuring device which is provided at one point on the third frame structure and measures the Y-axis direction displacement at one point of the support reference member of the main reflector.

* * * * *